United States Patent Office 2,700,606
Patented Jan. 25, 1955

2,700,606
PRODUCTION OF VANADIUM METAL

Harley A. Wilhelm and John Reed Long, Ames, Iowa, assignors to the United States of America as represented by the United States Atomic Energy Commission No Drawing. Application August 1, 1951,
Serial No. 239,860

2 Claims. (Cl. 75—84)

The present invention is concerned with a method for the production of vanadium metal. More particularly, the present invention is directed to a process for the reduction of vanadium oxide, which may be employed with impure vanadium pentoxide and which will yield ductile massive vanadium metal.

Vanadium is one of the most widely distributed elements occurring in small percentages in granite, sedimentary rocks, clays and in many iron, lead and copper ores. The metal is one of the least volatile metals at the melting point and has highly desirable characteristics as a structural metal. It is, however, extremely difficult to reduce to the pure metallic state from its oxides and consequently very little of the metal has been obtained. One method of producing metallic vanadium comprises the reduction of vanadium pentoxide with calcium metal in the presence of calcium chloride. This method, however, may only be used with very pure vanadium pentoxide and the product obtained is usually in the form of finely divided vanadium particles. Other methods have in the past been devised for the production of massive vanadium metal but these methods require as a starting material a very pure form of vanadium oxide such as chemically pure $V_2O_5$ in order to produce a ductile metal.

It is an object of the present invention to provide a method for producing ductile, malleable vanadium metal from a vanadium oxide.

It is an additional object of the present invention to provide a method which may be employed with a technical grade vanadium oxide as the starting material for producing ductile malleable vanadium metal, a substantial portion of which will be in the form of a massive regulus.

Broadly, the process of the present invention comprises reacting a mixture of sulfur and vanadium oxide with calcium metal whereby the vanadium oxide is reduced and the resultant product is predominantly a massive regulus of ductile, malleable vanadium metal. The essence of the present invention lies in the employment of sulfur as the booster in the reaction mixture.

While the process of the present invention may be employed with chemically pure vanadium pentoxide, the great advantage of the present method lies in its ability to produce massive ductile vanadium metal from the technical grade vanadium oxides such as technical grade vanadium pentoxide, sinces the cost of technical grade vanadium pentoxide is at present about one-seventh of the cost of the chemically pure grade vanadium pentoxide. Technical grade $V_2O_5$ is actually a sodium vanadate ore concentrate, usually containing about 87–93% $V_2O_5$, 5–6% sodium oxide, and less than 1% of other impurities such as aluminum, iron, calcium, silicon and magnesium. The technical grade $V_2O_5$ is thoroughly dried and by the process of our invention is then mixed with finely divided metallic calcium and sulfur. The sulfur is usually added in an $S:V_2O_5$ ratio of about 1:8 (in grams). The $V_2O_5$ content of technical grade $V_2O_5$ may be considered as 90%, if the actual $V_2O_5$ content is not known. Considerable variation in this ratio is permissible. The sulfur acts as a booster, reacting directly with the calcium. The total heat generated during the reduction of the vanadium oxide may be considered to be the sum of the heats generated by the two reactions:

$$Ca + S = CaS$$
$$5Ca + V_2O_5 = 5CaO + 2V$$

It has been found desirable to use an approximately 40% or greater, excess of calcium to $V_2O_5$ over the stoichiometric proportions indicated (in addition to the stoichiometric amount of calcium required to react with the sulfur present), and best results have been obtained when the excess is in the range 60–70%.

The reaction is normally carried out in a standard reduction bomb. The bomb should be lined with some defractory material such as dolomitic oxide or magnesia, since a high internal temperature is produced by the reaction. It has been found that if a small quantity of calcium is placed at the bottom of the bomb before the charge is introduced, a more uniform reduction is obtained. The reaction is initiated by rapidly heating the bomb to an elevated temperature such as 700° C.

The process of the present invention may be better understood by consideration of the examples which follow.

Example I

A 180-gram quantity of $V_2O_5$ (technical grade fused) was thoroughly dried and then pulverized. The pulverized $V_2O_5$ was mixed with 307 g. of metallic calcium particles and 20 g. of sulfur. This mixture was placed in a 2.5" reduction bomb having a dolomitic oxide liner and 5 g. of metallic calcium at the bottom of the charge (bringing the total calcium content of the bomb to 312 g.). The bomb was closed and then heated to about 700° C. within five minutes. The firing of the bomb may be observed as it is characterized by a sudden rise in the temperature of the container. The bomb upon opening was found to contain a massive regulus of pure vanadium metal weighing 65.4 g. corresponding to a 72% yield. The slag also contained several smaller pieces of ductile vanadium metal (which were recovered from the slag by leaching with HCl) sufficient to bring the total amount of metal up to 74.7 g. corresponding to 83% total yield. The metal recovered was a ductile form having a hardness of approximately 75 on the Rockwell B scale. The metal is sufficiently malleable that a 90% reduction can easily be achieved by cold-rolling.

The process of the present invention may also be used for the recovery of ductile vanadium metal from technical grade $V_2O_3$ as shown by the following example.

Example II

A quantity of air-dried technical grade $V_2O_5$ was treated with hydrogen at an elevated temperature whereby substantially all of the vanadium pentoxide was reduced to the $V_2O_3$ form. A 150-g. quantity of the $V_2O_3$ was mixed with 55 g. of sulfur and 297 g. of metallic calcium particles. Five grams of metallic calcium particles was placed in the bottom of a 2.5" bomb containing a sintered dolomitic oxide liner and the charge was then placed on top of the metallic calcium particles. The bomb was closed and placed in a furnace and was quickly heated to 700° C. at which time the reaction started. Upon opening it was found that a massive regulus of vanadium metal weighing 74 g. had been produced. This corresponded to an 81% yield. The vanadium metal was ductile having a hardness of 75 on the Rockwell B scale.

It will be apparent that the above-described embodiments of the invention are illustrative and modifications thereof will be apparent to those skilled in the art without departing from the spirit of the invention or the scope of the appended claims.

What is claimed is:

1. The process of preparing massive ductile vanadium metal from technical grade vanadium pentoxide containing 87–93% of $V_2O_5$, 5–6% of sodium oxide, and less than 1% of other impurities, which comprises forming a reaction mixture consisting of said technical grade vanadium pentoxide, sulfur, and calcium, with the sulfur:$V_2O_5$ content in an approximate weight ratio of 1:8, and the calcium present in greater than a 50% stoichiometric excess over that required to react with the $V_2O_5$ in addition to the stoichiometric amount required to react with the sulfur present, and heating the reaction mixture to approximately 700° C. in a reduction bomb.

2. A process as defined in claim 1 in which the reaction mixture consists of 180 parts by weight of said technical grade vanadium pentoxide, 20 parts by weight of sulfur, and 312 parts by weight of metallic calcium.

References Cited in the file of this patent

UNITED STATES PATENTS

| | | |
|---|---|---|
| 1,088,909 | Kuzel | Mar. 3, 1914 |
| 1,318,709 | Vautin | Oct. 14, 1919 |
| 2,421,029 | Magram | May 27, 1947 |
| 2,561,526 | McKechnie et al. | July 24, 1951 |
| 2,576,763 | Linz | Nov. 27, 1951 |

FOREIGN PATENTS

| | | |
|---|---|---|
| 27,625 | Great Britain | of 1896 |
| 24,148 | Great Britain | of 1903 |